US008842070B2

(12) United States Patent
Oakley et al.

(10) Patent No.: US 8,842,070 B2
(45) Date of Patent: Sep. 23, 2014

(54) INTEGRATED TRACKING FOR ON SCREEN NAVIGATION WITH SMALL HAND HELD DEVICES

(75) Inventors: Nicholas W. Oakley, Portland, OR (US); Achod M. Goganian, Beaverton, OR (US)

(73) Assignee: Intel Corporation, Santa Clara, CA (US)

( * ) Notice: Subject to any disclaimer, the term of this patent is extended or adjusted under 35 U.S.C. 154(b) by 1054 days.

(21) Appl. No.: 10/803,334

(22) Filed: Mar. 17, 2004

(65) Prior Publication Data

US 2005/0206620 A1    Sep. 22, 2005

(51) Int. Cl.
| G06F 3/033 | (2013.01) |
| G06F 3/0346 | (2013.01) |
| G06F 3/0354 | (2013.01) |
| G06F 3/0484 | (2013.01) |
| G06F 3/03 | (2006.01) |

(52) U.S. Cl.
CPC .......... *G06F 3/04842* (2013.01); *G06F 3/0346* (2013.01); *G06F 3/0354* (2013.01); *G06F 3/0317* (2013.01)
USPC ............................ 345/158; 715/786; 715/864

(58) Field of Classification Search
CPC ..... G06F 3/0346; G06F 3/0304; G06F 3/033; G06F 1/1694
USPC ........... 345/863, 158, 173–178; 715/786, 864
See application file for complete search history.

(56) References Cited

U.S. PATENT DOCUMENTS

| 5,912,660 | A  * | 6/1999  | Gouzman et al. ............. 345/163 |
| 6,037,937 | A  * | 3/2000  | Beaton et al. ................. 715/764 |
| 6,337,678 | B1 * | 1/2002  | Fish ............................. 345/156 |
| 6,466,198 | B1 * | 10/2002 | Feinstein ..................... 345/158 |
| 6,677,929 | B2 * | 1/2004  | Gordon et al. ............... 345/156 |
| 6,750,877 | B2 * | 6/2004  | Rosenberg et al. .......... 715/701 |
| 6,788,293 | B1 * | 9/2004  | Silverbrook et al. ......... 345/173 |
| 6,968,508 | B2 * | 11/2005 | Lucaci et al. ................ 715/784 |
| 6,977,645 | B2 * | 12/2005 | Brosnan ....................... 345/166 |
| 6,986,614 | B2 * | 1/2006  | McLoone ..................... 400/472 |
| 7,019,319 | B2 * | 3/2006  | Lapstun et al. ............... 250/566 |
| 7,102,541 | B2 * | 9/2006  | Rosenberg ..................... 341/20 |
| 7,148,875 | B2 * | 12/2006 | Rosenberg et al. .......... 345/156 |
| 7,305,631 | B1 * | 12/2007 | Bort ............................. 715/864 |
| 7,463,238 | B2 * | 12/2008 | Funkhouser et al. ........ 345/107 |
| 7,499,040 | B2 * | 3/2009  | Zadesky et al. .............. 345/204 |
| 2002/0093483 | A1 * | 7/2002 | Kaplan ........................ 345/158 |
| 2002/0093492 | A1 * | 7/2002 | Baron .......................... 345/173 |
| 2002/0190947 | A1 * | 12/2002 | Feinstein ...................... 345/158 |
| 2003/0090474 | A1 * | 5/2003 | Schaefer ...................... 345/173 |
| 2004/0008191 | A1 * | 1/2004 | Poupyrev et al. ............ 345/184 |
| 2004/0169674 | A1 * | 9/2004 | Linjama ....................... 345/702 |
| 2004/0212586 | A1 * | 10/2004 | Denny, III .................... 345/156 |
| 2004/0227742 | A1 * | 11/2004 | Fateh et al. .................. 345/204 |
| 2004/0252119 | A1 * | 12/2004 | Hunleth et al. ............... 345/440 |
| 2005/0030292 | A1 * | 2/2005 | Diederiks .................... 345/173 |
| 2009/0153501 | A1 * | 6/2009 | Schultz et al. ............... 345/173 |

OTHER PUBLICATIONS

Nicholas W. Oakley, "Always-On Removable Communicator Display", U.S. Appl. No. 10/608,695, filed Jun. 27, 2003.

* cited by examiner

*Primary Examiner* — Steven Sax
*Assistant Examiner* — Christopher J Fibbi
(74) *Attorney, Agent, or Firm* — Blakely, Sokoloff, Taylor & Zafman LLP (57) ABSTRACT

A method for navigating information displayed on a display of a computer system includes determining movement of the computer system. The movement of the computer system is sensed by a movement sensor.

13 Claims, 7 Drawing Sheets

INTEGRATED TRACKING FOR ON SCREEN NAVIGATION WITH SMALL HAND HELD DEVICES

FIELD OF INVENTION

The present invention generally relates to the field of data processing. More particularly, an embodiment of the present invention relates to enabling documents to be viewed with a portable device.

BACKGROUND

Mobile computer systems such as, for example, laptop or notebook computer systems, personal digital assistants (PDA), cellular phones, etc. are quickly gaining popularity because of their small size, lightweight, increase in performance and decrease in cost. Depending on the type of systems, the size of the display may vary. For example, a laptop computer system may have a 15 inch display, whereas a PDA may have a smaller display. One drawback of having a small display is the ability to view information. Often, information is filtered such that limited amount can be displayed. When the information cannot be filtered, it may be possible to display the information. The smaller display also makes it difficult to navigate the information being displayed especially when there is limited navigation capability.

BRIEF DESCRIPTION OF THE DRAWINGS

The invention may be best understood by referring to the following description and accompanying drawings that are used to illustrate embodiments of the invention. In the drawings.

DESCRIPTION

For one embodiment, a method and system for controlling information displayed in a computer system is disclosed. The computer system may be a handheld computer system equipped with a movement sensor. The information displayed on a display screen of the computer system may be associated with a portion of the data entity. Navigating the information to display other portions of the data entity may be performed by sensing movement of the computer system.

In the following detailed description of embodiments of the present invention numerous specific details are set forth in order to provide a thorough understanding of the present invention. However, it will be apparent to one skilled in the art that embodiments of the present invention may be practiced without these specific details. In other instances, well-known structures and devices are shown in block diagram form, rather than in detail, in order to avoid obscuring the present invention.

Reference in the specification to "one embodiment" or "an embodiment" means that a particular feature, structure, or characteristic described in connection with the embodiment is included in at least one embodiment of the invention. The appearances of the phrase "for one embodiment" in various places in the specification are not necessarily all referring to the same embodiment.

In the following discussion, the phrase computer system may refer to a laptop computer system, a handheld computer system, a micro personal computer system, a tablet computer system, a digital organizer, a cellular phone or any other portable computer systems that may include a display screen to display information.

Overview

Figure 1:
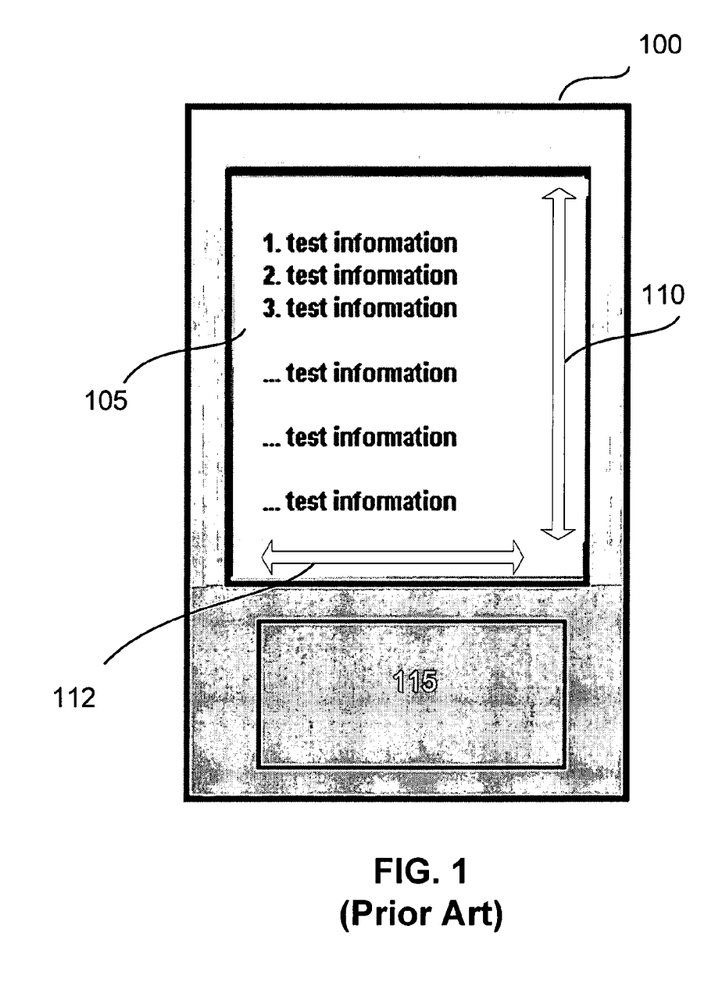
FIG. 1 illustrates one example of a prior art computer system, in accordance with one embodiment.

FIG. 1 illustrates one example of a prior art computer system, in accordance with one embodiment. Computer system 100 may be a digital organizer such as those manufactured by, for example, palmOne Inc. of Milpitas, Calif. The computer system 100 may include a writing area 115 and a display 105. The display 105 may be a color display, a monochrome display, etc. The display 105 may be small (e.g., 160×160 pixel display) and may limit the amount of information that is viewable at a time.

To view information on the display 105, a vertical scroll bar 110 may be provided to enable scrolling. Depending on the type of information, there may also be a horizontal scroll bar 112 to enable displaying information adjacent to the information currently displayed. A pointing device or a stylus (not shown) may be used to interact with the scroll bars 110, 115. Another technique used to enable scrolling includes using a thumb wheel (not shown). To scroll diagonally, a combination of vertical and horizontal scrolling may be required, making the techniques described in this example slow and cumbersome.

Movement Sensor

Figure 2:
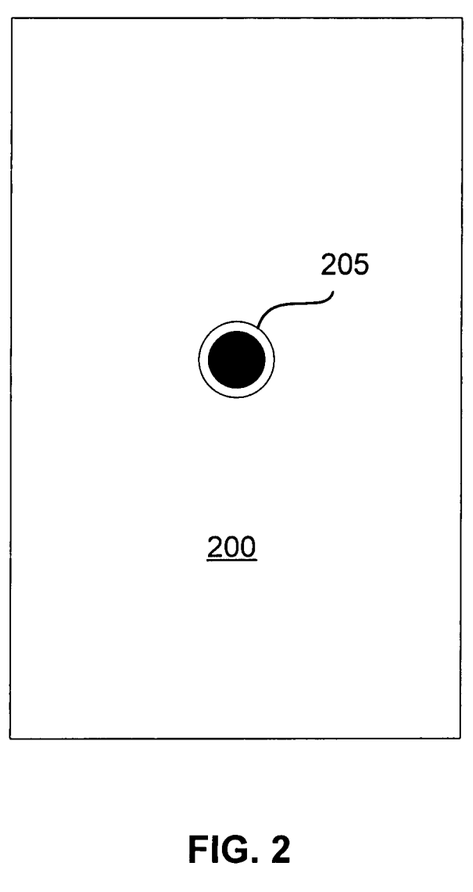
FIG. 2 is a diagram illustrating one example of a bottom view of a computer system equipped with a movement sensor, in accordance with one embodiment.

FIG. 2 is a diagram illustrating one example of a bottom view of a computer system equipped with a movement sensor, in accordance with one embodiment. For one embodiment, a bottom side of the computer system 200 may include a movement sensor 205. The movement sensor 205 may be any device that can sense directions of the movement of the computer system 200 on a surface. The surface may be generally flat. The bottom side of the computer system 200 may be designed with appropriate surface contacts (not shown) made with material that may enable the computer system 200 to be moved across the surface with relative ease while not interfering with functionalities of the movement sensor 205. For one embodiment, the movement sensor 205 may be an optical sensor. Optical sensors are known to one skilled in the art. The movement sensor 205 may also be located at a location other than the location illustrated in FIG. 2 as long as it is able to sense the directions of the movements of the computer system 200. For one embodiment, the bottom side of the computer system 200 may include a second movement sensor (not shown). The combination of the movement sensor 205 and the second movement sensor may enable detection of angular position or rotation of the computer system 200.

Translation Logic

For one embodiment, the computer system 200 may include logic that translates the information sensed by the movement sensor 205. This logic may be referred to herein as translation logic. The translation logic may be implemented in software, hardware, or a combination of both. For example, the translation logic may translate the information sensed by the movement sensor 205 into operations that can be performed by the computer system 200.

Cursor Control

Figures 3A, 3B:
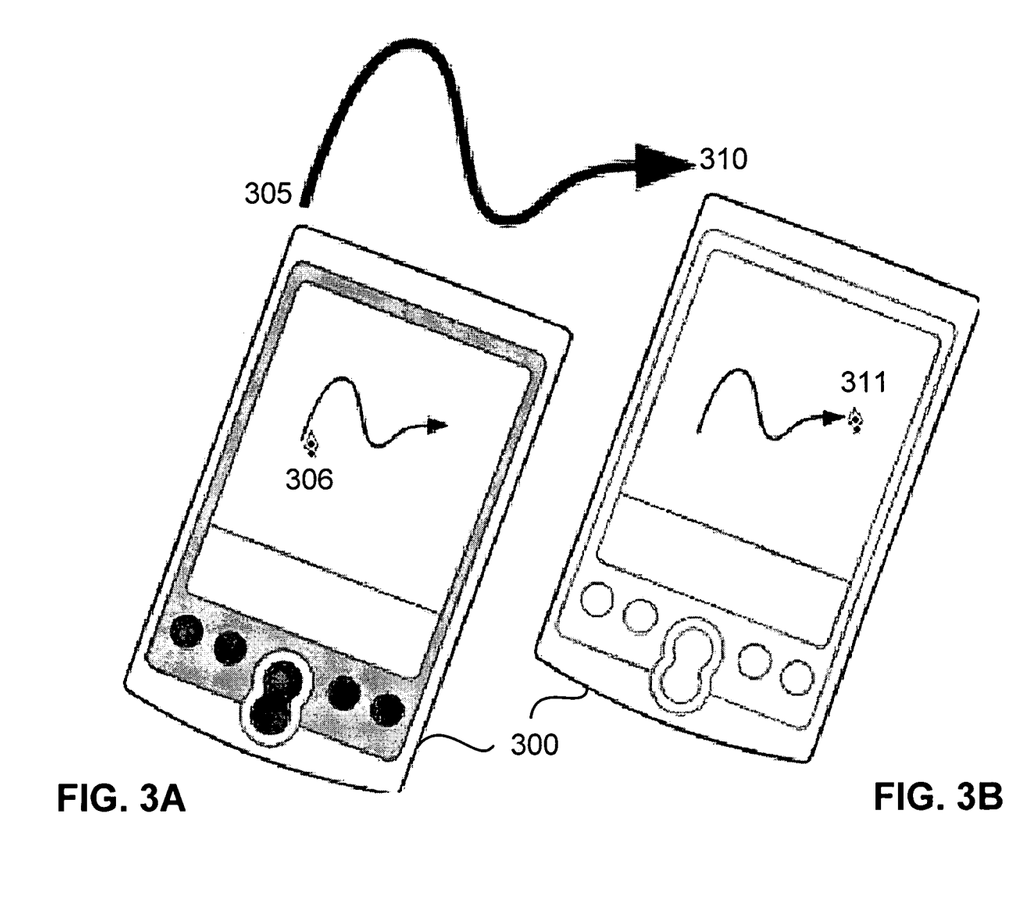
FIGS. 3A and 3B illustrate an example of controlling location of a cursor in a computer system equipped with a movement sensor, in accordance with one embodiment.

FIGS. 3A and 3B illustrate an example of controlling location of a cursor in a computer system equipped with a movement sensor, in accordance with one embodiment. Computer system 300 is illustrated with its top side and its display visible. The curve line drawn above the computer system 300 illustrates a pattern that the computer system 300 has moved through in moving from location 305 (FIG. 3A) at time t1 to location 310 (FIG. 3B) at time t2. This pattern may be sensed by the movement sensor 205 and provided to the translation logic. The translation logic may translate information associated with the pattern into operations that may result in moving a cursor along a similar pattern. This example is illustrated with a cursor located at position 406 (FIG. 3A) before the movement of the computer system 300 and at position 411 (FIG. 3B) after the movement of the computer system 300. The curve lines drawn on the display illustrate the similarity between the movement of the cursor and the movement of the computer system 300.

Document Control

Figure 4:
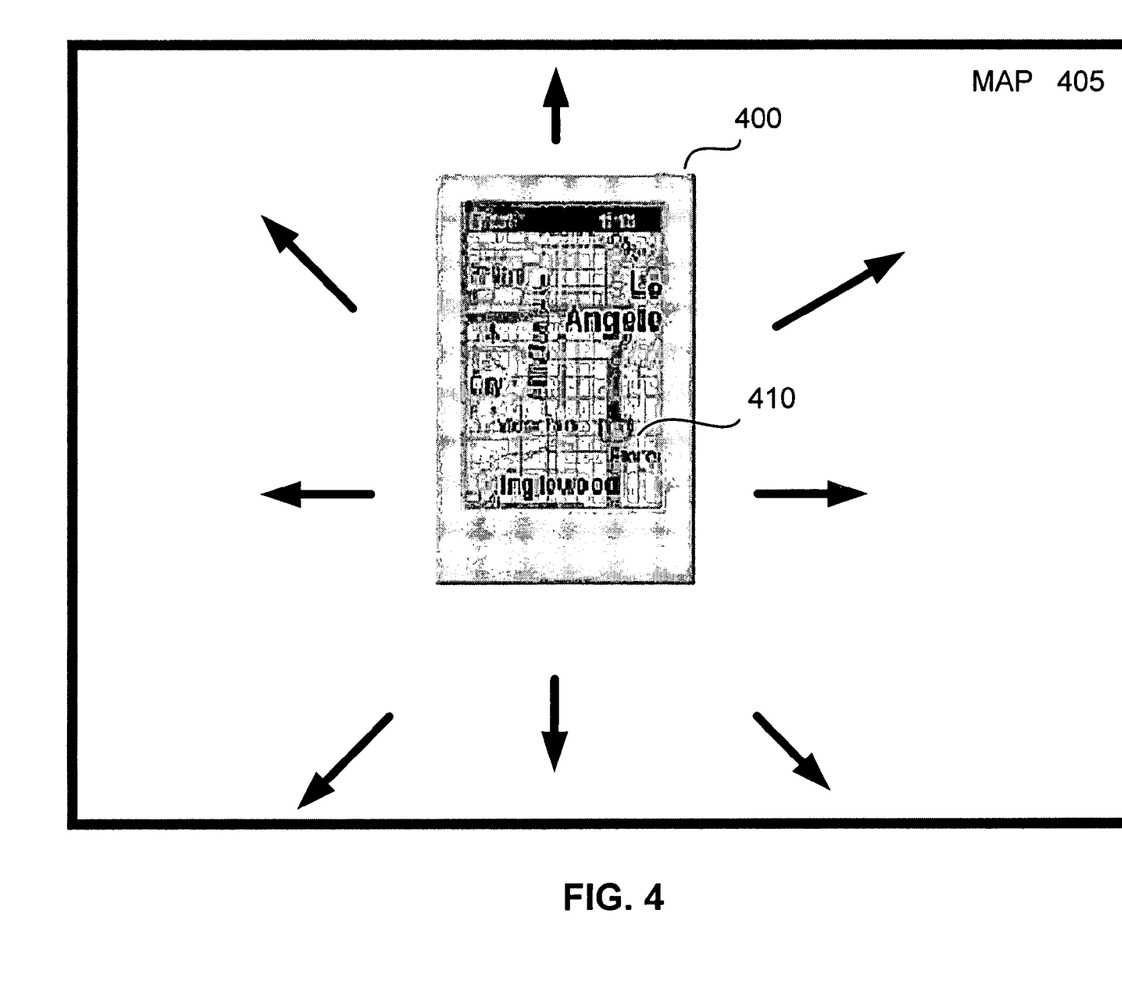
FIG. 4 illustrates an example of controlling information displayed on a display screen of a computer system equipped with a movement sensor, in accordance with one embodiment.

FIG. 4 illustrates an example of controlling information displayed on a display of a computer system equipped with a movement sensor, in accordance with one embodiment. Computer system 400 is illustrated with its display visible. The display may be viewed as a window to a large document (e.g., a map) that cannot be displayed in its entirety due to the small size of the display. In this example, the information being displayed is associated with a section or portion 410 of a map 405. The map 405 may be stored in the computer system 400, or it may be accessed via a network. The map 405 in this example is illustrated logically rather than physically.

For one embodiment, the translation logic may translate the information sensed by the movement sensor 205 into operations that may cause another section of the document to be displayed. The selection of this other section may be consistent with the pattern of movement of the computer system 400. Referring to FIG. 4, when the computer system 400 is moved horizontally toward the right, the display may include a section of the document that is on the right side of the section previously included on the display. Other arrows illustrated in FIG. 4 represent different possible directions (e.g., vertical, diagonal, etc.) that the computer system 400 may be moved to display different sections of the document.

For one embodiment, the movement sensor 205 may be a mechanical sensor such as, for example, one that is implemented using a trackball. This may enable the movement sensor 205 to be manipulated while the computer system 400 is not placed against a surface. For example, a user may place a finger over the trackball from the bottom side of the computer system 400 and navigate or control information to be included on the display by turning the trackball. The movement of the trackball may then be sensed by the movement sensor 205. It may be noted that one advantage of using the movement sensor 205 is that scrolling of the document in the diagonal direction can be easily performed and thus can be very intuitive.

Figure 5A:
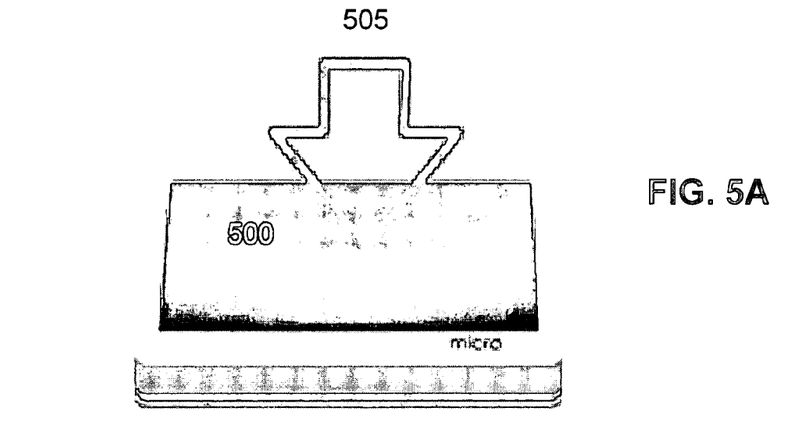
FIGS. 5A-5C are diagrams illustrating different examples of interactions with a computer system equipped with a movement sensor, in accordance with one embodiment.
Figure 5B:
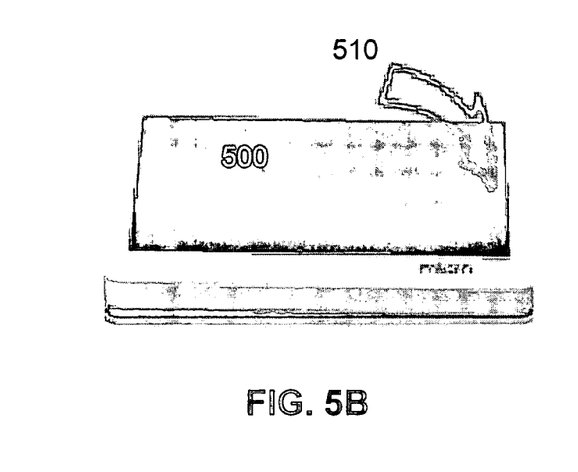
Figure 5C:
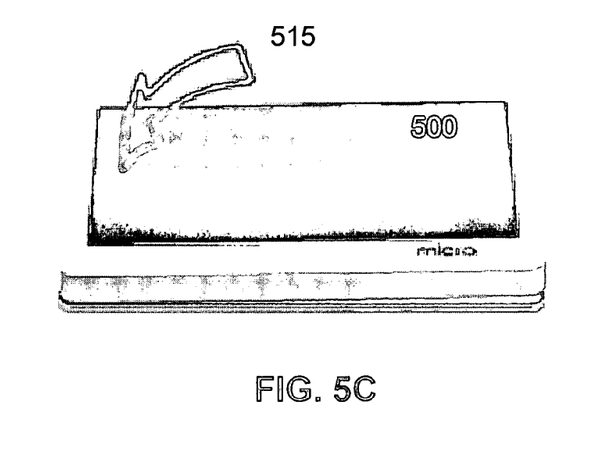

FIGS. 5A-5C are diagrams illustrating different examples of interactions with a computer system equipped with a movement sensor, in accordance with one embodiment. For one embodiment, in addition to having a movement sensor 205, computer system 500 may include an upper section (not shown) and a lower section (not shown). The display may be part of the upper section. The bottom side of the computer system 500 may be part of the lower section. For one embodiment, when a pressure is applied to the upper section, the upper section may move slightly toward the lower section. The upper section may then move back to its normal default position when the pressure is removed. This type of movement may be referred to as a clicking motion.

For one embodiment, depending on where the pressure is applied to the upper section, the computer system 500 may perform different operations. For example, when a pressure is applied such that the upper section is almost evenly displaced toward the lower section, a first mouse click may be recognized by the computer system 500 and corresponding actions may be performed. The same mouse click may be recognized when the pressure 505 is applied toward the middle of the upper section (FIG. 5A). When the pressure 510 is applied toward the right side of the upper section (FIG. 5B), a second mouse click may be recognized by the computer system 500. When the pressure 515 is applied toward the left side of the upper section (FIG. 5C), a third mouse click may be recognized by the computer system 500. The translation logic may translate the different types of clicking motions of the upper section relative to the lower section into operations to be performed by the computer system 500. The ability to cause operations to be performed by initiating different clicking motions as described with FIGS. 5A-5C may enable a user to use the computer system 500 more efficiently.

Process

Figure 6:
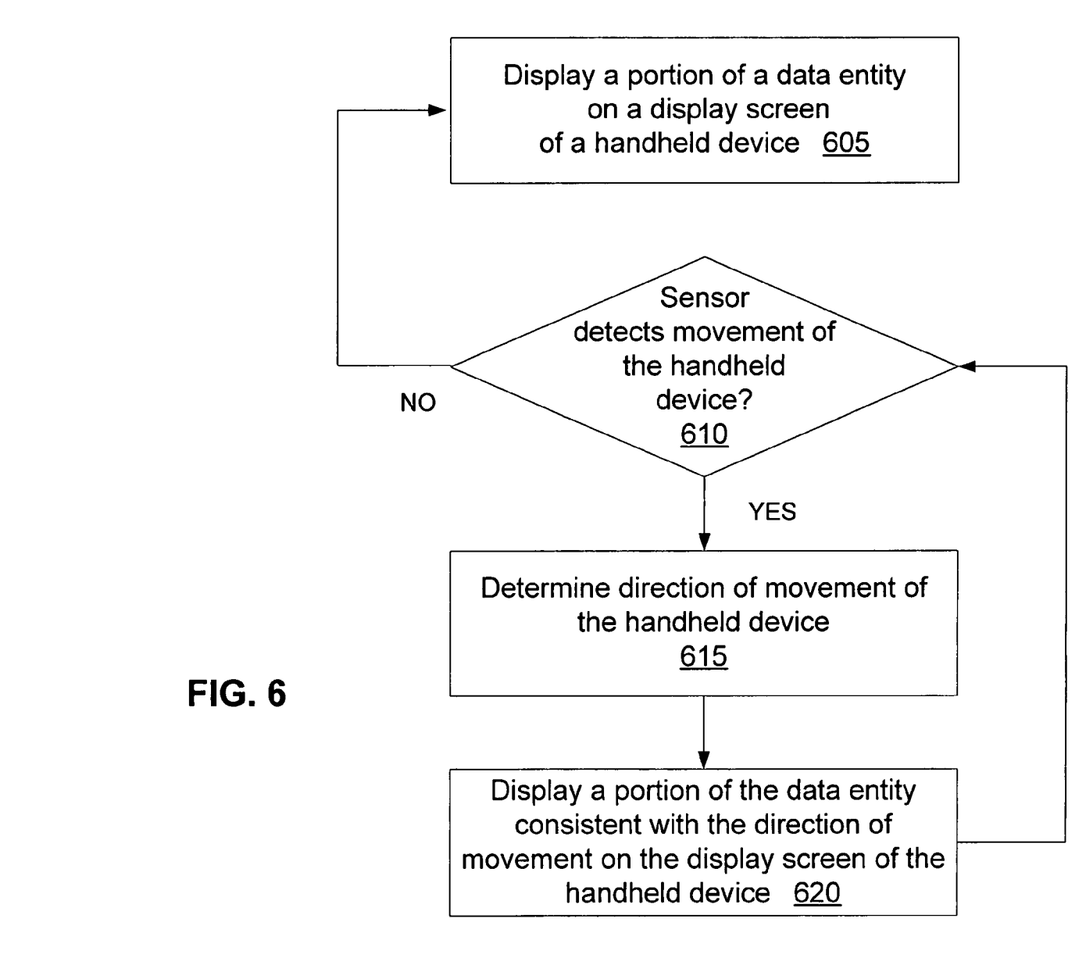
FIG. 6 is a flow diagram illustrating one example of a process of determining information to be displayed on a computer system equipped with a movement sensor, in accordance with one embodiment.

FIG. 6 is a flow diagram illustrating one example of a process of determining information to be displayed on a computer system equipped with a movement sensor, in accordance with one embodiment. The process may be performed by the computer system using the information provided by the movement sensor 205. At block 605, the computer system is displaying information associated with one section of a data entity (e.g., a document). At block 610, a test is made to determine if the movement sensor 205 has sensed any movement of the computer system.

When no movement is sensed, the computer system may continue to display the same information. However, when the computer system is moved, the movement sensor 205 senses the movement information, as shown in block 615. This information may then be translated by the translation logic into operations to display another section of the data entity, as shown in block 620. For example, when the computer system is moved in a vertical direction on a surface, the computer system may display a section of the data entity that is above a section that was previously displayed. As another example, when the computer system is equipped with a mechanical sensor such as a trackball, the same result may be accomplished by turning the trackball downward to scroll the document being displayed upward. It may be noted that the process described may be used to scroll a document, move a cursor, or perform any operations that normally requires using a mouse or similar controlling devices.

Computer System

Figure 7:
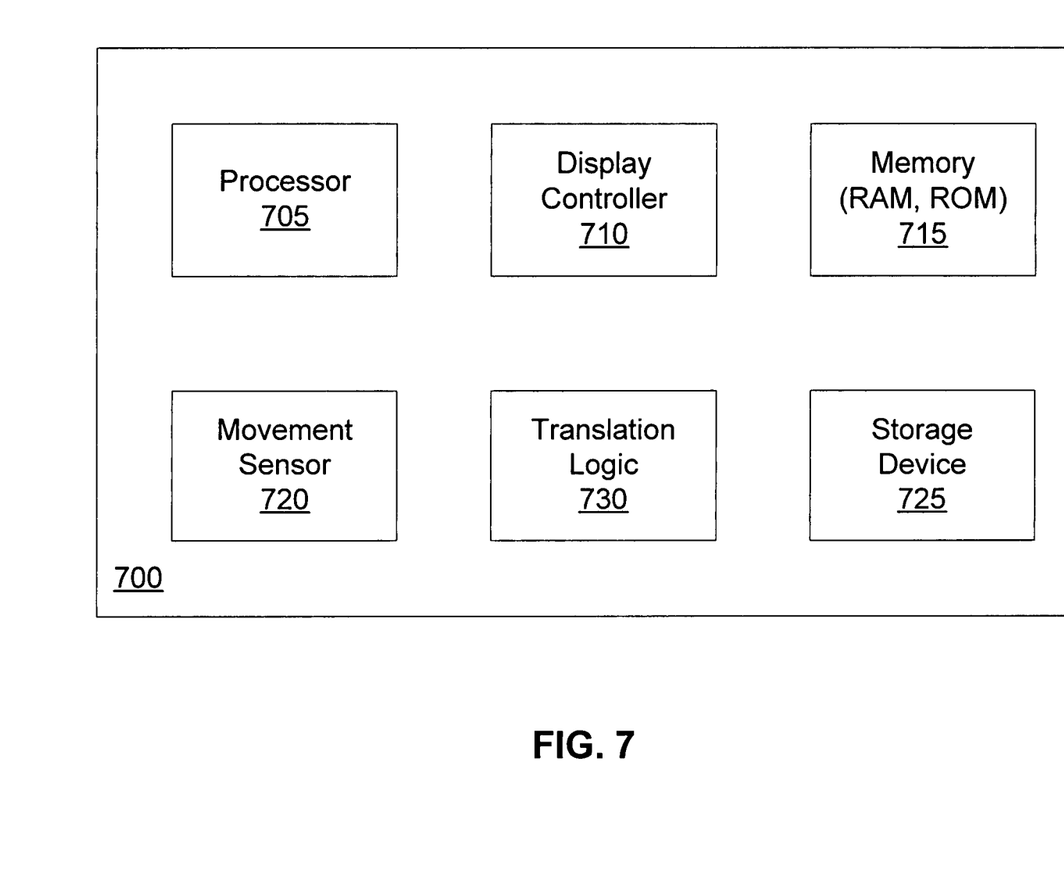
FIG. 7 illustrates one example of a computer system, in accordance with one embodiment.

FIG. 7 illustrates one example of a computer system, in accordance with one embodiment. Computer system 700 may be a handheld computer system and may include processor 705. The processor 705 may be a processor in the family of Pentium processors manufactured by Intel Corporation of Santa Clara, Calif. Other processors may also be used. The computer system 700 may include a display controller 710 and memory 715. The display controller 710 may be coupled to a display (not shown) which may be a liquid crystal display (LCD) or a display that uses other suitable display technology. The memory 715 may be a combination of one or more static random access memory (SRAM), dynamic random access memory (DRAM), read only memory (ROM), etc.

The computer system 700 may also include a movement sensor 720, translation logic 730 and a storage device 725. The movement sensor 720 may be an optical sensor, a mechanical sensor, or any sensor that may be used to detect movements of the computer system 700. The translation logic 730 may include logic to translate movement information sensed by the movement sensor 720. The translation logic 730 may translate that information into operations that can be processed by the processor 705. The storage device 725 may be used to store the data entity that may be included on the display of the computer system 700. Although not shown, the computer system 700 may also include other components to enable it to perform various functions.

Computer Readable Media

It is also to be understood that because embodiments of the present invention may be implemented as one or more software programs, embodiments of the present invention may be implemented or realized upon or within a machine readable medium. For example, the translation logic may be implemented in software, and the instructions associated with the translation logic may be stored in a machine readable medium. A machine readable medium may include any mechanism for storing or transmitting information in a form readable by a machine (e.g., a computer). For example, a machine readable medium may include read only memory (ROM); random access memory (RAM); magnetic disk storage media; optical storage media; flash memory devices, etc.

In the foregoing specification, the invention has been described with reference to specific exemplary embodiments thereof. It will, however, be evident that various modifications and changes may be made thereto without departing from the broader spirit and scope of the invention as set forth in the appended claims. The specification and drawings are, accordingly, to be regarded in an illustrative rather than a restrictive sense.

What is claimed is:

1. A method, comprising:
    sensing a directional movement of a computer system across a surface with a first movement sensor integrated into a bottom face of a lower section of the computer system having an upper section parallel to the lower section;
    sensing an angular position of the computer system in relation to the surface with the first movement sensor and a second movement sensor integrated into the bottom face of the lower section of the computer system;
    adjusting information displayed on a display of the computer system, the display being part of the upper section, the display initially showing a first section of a document, the document being larger than the display, adjusting information displayed on the display of the computer system including changing the display to displaying a second section of the document, wherein the position of the second section in the document in relation to the first section is consistent with a pattern of movement of the computer system across the surface sensed by the first movement sensor and the second movement sensor;
    sensing external pressure on a frame surrounding the display in the upper section, the external pressure to move a plane of the upper section;
    translating the external pressure on the frame of the upper section to a mouse click action associated with an operation corresponding to the movement of the plane of the upper section relative to the lower section of the computer system, wherein translating the external pressure on the frame of the upper section to a mouse click action includes recognizing the mouse click action as one of a left side pressure, right side pressure, or middle pressure, wherein recognizing the middle pressure mouse click action includes recognizing a first mouse click in response to pressure being evenly displaced across the frame of the upper section; and
    translating each of the mouse clicks to an operation associated with viewing an aspect of the displayed information of the document at the position sensed by the lower section of the computer system.

2. The method of claim 1, wherein the first movement sensor and the second movement sensor are each either an optical sensor or a mechanical sensor, the optical or mechanical sensor being operable to sense movement across surfaces.

3. The method of claim 1, further comprising:
    correlating the directional movement across the surface to a cursor movement on the display of the computer system.

4. The method of claim 1, wherein translating the external pressure on the frame of the upper section to a mouse click includes:
    translating the external pressure of the first mouse click when the external pressure is applied to a central region of the upper section so that the entire plane of the upper section moves toward the lower section;
    translating the external pressure to a second mouse click when the external pressure is applied to a first portion of the upper section so that the plane of the upper section intersects the lower section; and
    translating the external pressure to a third mouse click when the external pressure is applied to a second portion of the upper section so that the plane of the upper section intersects the lower section.

5. The method of claim 1, wherein the surface is flat.

6. The method of claim 1, wherein the computer system is in contact with the surface.

7. The method of claim 1, wherein the document is a map that is larger than the display of the computer system.

8. A non-transitory computer-readable storage medium having stored thereon sequences of instructions which are executable by a computer system, and which, when executed by the computer system, cause the computer system to perform a method, comprising:
    sensing a directional movement of a computer system across a surface with a first movement sensor integrated into a bottom face of a lower section of the computer system having an upper section parallel to the lower section;
    sensing an angular position of the computer system in relation to the surface with the first movement sensor and a second movement sensor integrated into the bottom face of the lower section of the computer system;
    adjusting information displayed on a display of the computer system, the display being part of the upper section, the display initially showing a first section of a document, the document being larger than the display, adjusting information displayed on the display of the computer system including changing the display to displaying a second section of the document, wherein the position of the second section in the document in relation to the first section is consistent with a pattern of movement of the computer system across the surface sensed by the first movement sensor and the second movement sensor;

sensing external pressure on a frame surrounding the display in the upper section, the external pressure to move a plane of the upper section relative to the lower section;

translating the external pressure on the frame of the upper section to a mouse click action associated with an operation corresponding to the movement of the plane of the upper section relative to the lower section of the computer system, wherein translating the external pressure on the frame of the upper section to a mouse click action includes recognizing the mouse click action as one of a left side pressure, right side pressure, or middle pressure, wherein recognizing the middle pressure mouse click action includes recognizing a first mouse click in response to pressure being evenly displaced across the frame of the upper section; and translating each of the mouse clicks to an operation associated with viewing an aspect of the displayed information of the document at the position sensed by the lower section of the computer system.

9. A computer system comprising:

a processor to operate the computer system;

an upper section and a lower section, the upper section and lower section being parallel with each other;

a display, the display being part of the upper section;

a first movement sensor integrated into a bottom face of the lower section, the first movement sensor to sense a directional movement of the computer system across a surface; and a second movement sensor integrated into the bottom face of the lower section, the first movement sensor and the second movement sensor to sense an angular position of the computer system in relation to the surface;

wherein the processor is to:

adjust information displayed on the display, the display initially showing a first section of a document, the document being larger than the display, wherein adjusting information displayed on the display of the computer system includes changing the display to display a second section of the document, wherein the position of the second section in the document in relation to the first section is consistent with a pattern of movement of the computer system across the surface sensed by the first movement sensor and the second movement sensor, translate sensed external pressure on a frame surrounding the display in the upper section to a mouse click action associated with an operation corresponding to the movement of a plane of the upper section relative to the lower section of the computer system, wherein translating the external pressure on the frame of the upper section to a mouse click action includes recognizing the mouse click action as one of a left side pressure, right side pressure, or middle pressure, wherein recognizing the middle pressure mouse click action includes recognizing a first mouse click in response to pressure being evenly displaced across the frame of the upper section, and translate each of the mouse clicks into an operation associated with viewing an aspect of the displayed information of the document at the position sensed by the lower section of the computer system.

10. The computer system of claim 9, wherein the first movement sensor and the second movement sensor are each either an optical sensor or a mechanical sensor.

11. The computer system of claim 9, further comprising surface contacts to enable movement of the computer system on the surface.

12. The computer system of claim 9, further comprising translation logic to translate information regarding the movement of the computer system across the surface into an operation of the computer system.

13. The computer system of claim 9, wherein the first movement sensor and the second movement sensor further detect a rotation of the computer system in relation to the surface.

* * * * *